June 3, 1969  G. I. COHN ET AL  3,447,374
METHOD AND MEANS FOR DETERMINING VOLUME OF LIQUID IN A TANK
Filed May 18, 1967
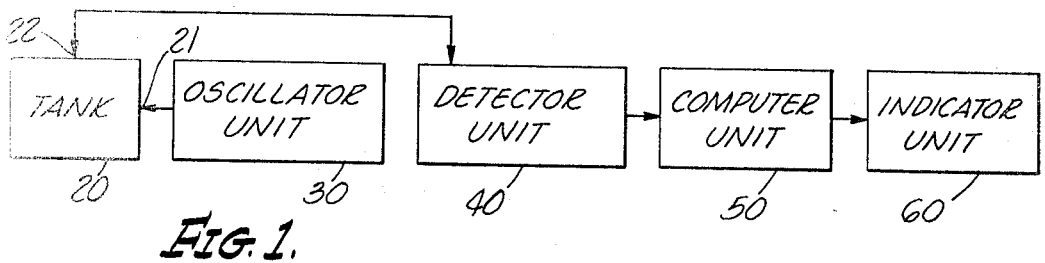
Fig. 1.
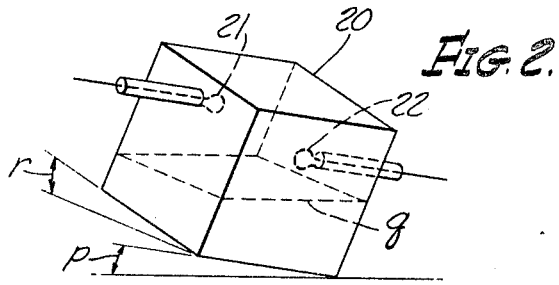
Fig. 2.
Fig. 3.
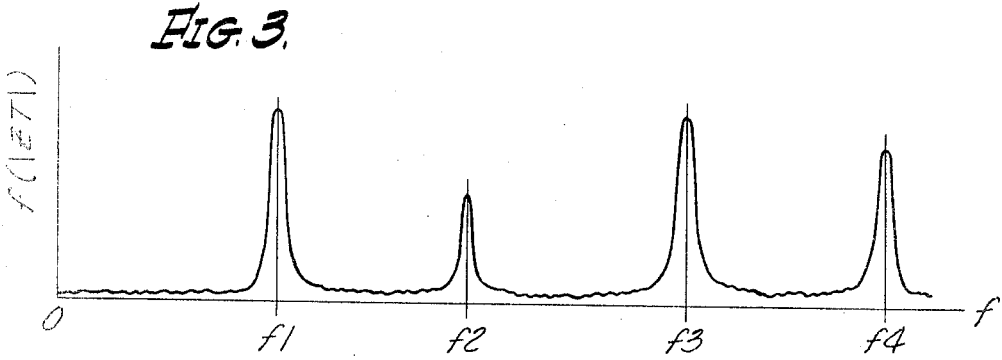
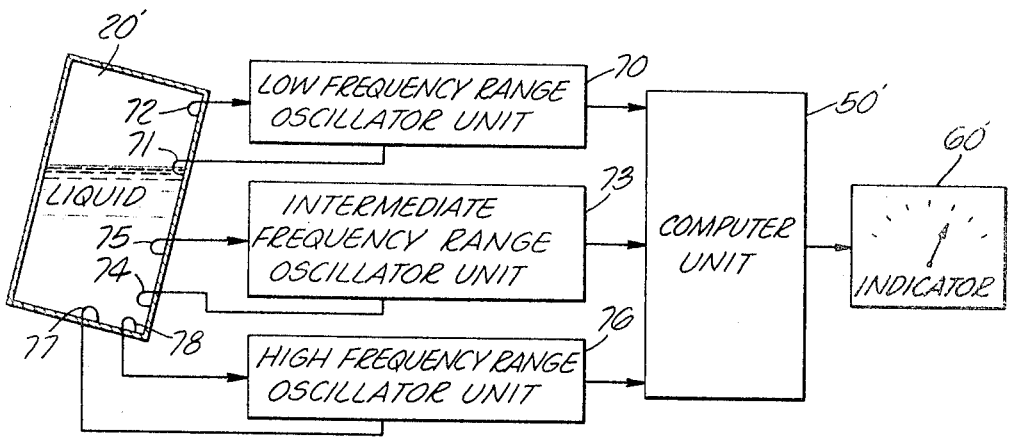
Fig. 4.
INVENTORS.
GEORGE I. COHN
HAROLD TORNHEIM
BY
ATTORNEYS

United States Patent Office 3,447,374
Patented June 3, 1969

3,447,374
METHOD AND MEANS FOR DETERMINING VOLUME OF LIQUID IN A TANK
George I. Cohn, 915 Monarch Drive, Pasadena, Calif. 91103, and Harold Tornheim, 430 N. Auburn, Sierra Madre, Calif. 91024
Filed May 18, 1967, Ser. No. 639,504
Int. Cl. G01f 23/28
U.S. Cl. 73—290       7 Claims

ABSTRACT OF THE DISCLOSURE

Means to measure the volume of liquid in a tank independently of angular attitude in space, comprising electromagnetic wave radiating means such as microwave antenna disposed in respective specific locations on the interior boundary of a specimen liquid tank. Electromagnetic wave energy is generated and supplied the radiating means while the frequency of the wave energy is repetitively varied through a waveband or frequency spectrum, and radiated wave energy is received either at the same antenna or another such means. The frequency spectrum is chosen so that during the sweep thereof three or more resonant mode frequencies are detected irrespective of the extent of the volume of liquid in the tank and the pitch and roll angles of the tank. The procedure is repeated for each of a number of degrees of tank pitch and each of a number of tank roll angles and a computer record is made of the matrix of tank pitch, roll, liquid volume and resonant frequencies at each repetition of the procedure. Thereafter, tanks of like configuration and dimensions may be similarly equipped. By repeating the radiating-detecting procedure and measuring the pitch and roll angles of the tank and computer-comparing the set of resonant frequencies and tank-attitude data with the recorded matrix of pitch, roll, liquid volume and resonant-frequencies information stored, the volume of liquid in the tank at any time is determined as that corresponding to matching of pitch, roll, and resonant frequencies information as stored in the computer memory.

---

This invention provides a unique method and means for determining the volume of liquid in a closed tank subject to various different pitch and roll attitudes, by first empirically determining responses of the tank to electromagnetic wave energy radiated in the tank as the frequency is swept over a range or band of sufficient breadth to encompass at least three different mode resonance frequencies of the unoccupied space in the tank, for each of various known extents of fill or liquid content, for each of a series of roll attitudes dispersed over the span from the maximum negative roll to the maximum positive roll to be encountered, for each of a series of pitch attitudes dispersed over the expected range of pitch attitudes from maximum negative pitch to a maximum positive pitch, the responses being detected by a detector and furnished to computer means as a respective series of manifestations. Each series of manifestations is unique to a particular tank, liquid, liquid volume, tank pitch, tank roll combination, whereby, subsequently, by subjecting the interior of a like tank to electromagnetic wave energy the frequency of which is swept over the noted frequency band or range, a series of manifestations representative of a series of resonant frequencies corresponding to a particular ratio of occupied to unoccupied space is obtained by the detecting means. These manifestations are furnished to the computer in the form of electric signals for processing relative to the previously empirically obtained sets of series of manifestations to derive an output signal representative of the volume of liquid currently in the tank. This signal is convertible by means such as a meter into a visible or other indication of the volume of liquid in the tank.

Measurement of the volume of liquid in a closed tank has been accomplished in a variety of ways. In the case of inaccessible tanks, as is the situation to which the present invention is more particularly applicable, automatically-operating means are required. Such means may be simple if the tank is of uniform cross-section and is stationary; but the means are more complex if the tank is of irregular configuration and/or the tank is subject to various different orientations during use, as is the case with fuel tanks in aircraft. In the latter instance, it is obvious that with differing degrees of pitch and/or roll, measurement of the level, or depth, of the liquid in the tank could at best provide only a very rough indication of the amount of liquid, and that indication only with an uncertain degree of error.

Thus resort has been had to other than purely mechanical means for the indicated purpose. For example, use has been made of the variable impedance offered to mechanical or acoustic wave energy by the liquid when the wave energy frequency is varied or "swept" through a frequency band or range sufficiently broad to include a resonance frequency. Also it is known to similarly radiate acoustic wave energy in the unoccupied portion of a liquid-containing tank, similarly sweeping the frequency of the wave-producing device (such as a piezoelectric or like magnetostrictive transducer) over a range of wave frequencies, to determine whether the solid or liquid material in the tank is above or below a known level. Such arrangements, and others of similar nature, are disclosed in U.S. Letters Patent to Rich No. 3,050,720; to Wescott et al. No. 3,110,890; to Sontheimer Nos. 2,621,517 and 2,621,518; to Atkinson No. 3,213,439; and to Newitt No. 3,241,368. All such arrangements, and the more common capacitance type liquid level gauges (of which those disclosed in U.S. Patents Nos. 3,199,350 and 3,140,608 are representative) are characterized by one or more undesirable attributes among which are the lack of ability to provide an accurate indication of the volume of liquid in a tank irrespective of the amount of liquid in the tank, the extent to which the tank is subjected to roll and the extent to which the tank is subjected to pitch.

The present invention, briefly, comprehends a method and system of apparatus or means, for determining by computer analysis of currently obtained manifestations representing a specific series of resonance frequencies of electromagnetic wave energy to which the interior of the tank is subjected and which manifestations are in all cases mathematically related to one another of sets of series of similar manifestations previously empirically obtained and registered or made effective in a computer. Thus, it is found that for each degree of fill of the tank there is a respective unique series of electromagnetic wave resonance frequencies for each of different degree of pitch of the tank, for each of different degrees of roll of the tank. Hence, in a sense, there is obtainable by empirical methods, a three-dimensional matrix of sets of electromagnetic wave resonance frequencies each set of which preferably includes at least three different mode resonant frequencies, at which wave energy is maximally absorbed in the tank when the frequency is swept over a range of frequencies sufficiently wide or broad to include such plurality of different mode resonant frequencies. Each set (for example, three) of such determined resonant frequencies is, accordingly, unique in representing a particular volumetric ratio of occupied to unoccupied space (and hence, in view of the tank volume remaining constant, the liquid-occupied space), in the tank for a particular angle or degree of roll and a corresponding particular angle of pitch of the tank.

The mentioned sets of empirically determined resonant frequencies in each case provide, by way of electrical frequency-meter or analogous means connected to an electromagnetic wave antenna or probe in the tank, respective sets of manifestations (such as electric output signals) of the resonant frequencies swept through by the sweep-frequency oscillator of an electromagnetic wave generating and radiating system arranged to radiate the wave energy in the space in the tank; and further, each of the electric output signals produced in wave-receiving means such as the receiving probe or antenna, is effectively a manifestation of a unique combination of occupied and unoccupied tank space, tank pitch angle, and tank roll angle. It is evident that these manifestations, being electrical signals, are susceptible to mathematical processing in an analog computer and/or storage, retrieval and processing in a general purpose information-processing system or computer when the signals are suitably re-formed in an analog-to-digital converter.

According to the invention, the tank is provided with one or more radiating probes or antenna means connected to radiate in the tank electromagnetic wave energy generating means such as an oscillator the frequency of which is varied over the necessary range or band of frequencies, the generating means is energized and made operative when a measure of volume of liquid in the tank is to be obtained, resonance conditions are detected by the receiving probe and wave receiving means connected thereto, such resonance condition in each instance during a particular frequency-sweep corresponding to a respective resonance mode and wave frequency which is one of a set of unique conditions mathematically (functionally) related to the volume of liquid in the tank and which received radiation causes a unique output signal to be produced by the receiving means. The output signals are translated to a computer means, the computer operates on the set of signals by either comparing the set with a matrix of sets of signal representations stored in the computer memory, or operating upon the incoming set of signals in accord with a mathematical algorithm stored in the computer (in the case of a digital general-purpose computer), or in the case of analog computer means, performing functional operations on the set of signals, and the computer and peripheral means produces an output representing the volume of liquid in the tank. The computer output is in either instance delivered to a meter or other registering device which furnishes an indication which in exemplary embodiment of the invention herein described is a visible numerical indication of the volume of liquid in the tank.

The preceding brief description of the method of the invention makes evident that principal objects of the invention are to provide a means, and a method, for determining the volume of liquid in a tank irrespective of the spatial attitude of the tank.

Other objects and advantages of the invention are hereinafter set out or made evident in the following detailed description relating to a preferred physical arrangement or organization of means and mode of opeartion thereof, and in the appended claims.

The preferred exemplary system according to the invention is schematically represented in the accompanying drawings, in which:

FIGURE 1 is a functional block diagram representing major components of apparatus comprised in one exemplary system;

FIGURE 2 is a view in elevation of a typical closed vessel or tank, shown partially filled with liquid;

FIGURES 3 is a graphical representation showing the amplitude of the energy picked up by the receiving probe in the tank illustrated in FIGURE 2, during a frequency-band sweep of the wave-generator or oscillator of the exemplary system, and depicts the steep increase of absorbed energy as the tank chamber becomes resonant in different modes of oscillation; and FIGURE 4 is a modified form of the system, in which a plurality of oscillators are employed utilizing the tank cavity as a part of its oscillating circuit. Each of these oscillators operates at a fixed frequency for a given tank fill and orientation, but each of these fixed frequencies can vary over a different frequency range as the tank fill and/or orientation is varied.

When electromagnetic wave energy is fed to a radiator or antenna within the interior of a tank, and the frequency of the wave energy is varied over a band of frequencies, it is known that at certain frequencies the wave energy is accepted by the tank to a much greater degree than is the case at non-resonant in-between frequencies. Thus, a graphical record of energy accepted plotted against frequency shows a plurality of frequencies at which energy transfer to the enclosed cavity from the radiating probe or antenna or impedance transfer function between an input probe and output probe, $Z_T$ is sharply increased. Those frequencies are the noted resonance frequencies. With the tank disposed at specific pitch and roll angles or attitudes and at a specifi c degree of "fill" (portion of total volume occupied by liquid), the tank interior may resonate in any of several different modes, each at a respective frequency. The result of such procedure for the tank shown in FIGURE 2 is graphically portrayed in FIGURE 3. Therein, the extent of energy absorption or the transfer impedance of the tank chamber as seen by the wave generator means and radiator and/or pick up probe and detector is noted to have sharply rising and falling peak values at resonant frequencies denoted $f_1$, $f_2$, $f_3$, and $f_4$, etc. The relative locations of the "peaks" or resonant frequencies to each other and to a base or starting frequency with change of either of the three variables, pitch ($p$), roll ($r$) and quantity of liquid ($q$) in the tank, are excited by the input probe 21 and sensed by the pick-up probe 22 remaining at fixed locations relative to the tank walls.

Thus according to the invention the tank 20 is provided with first and second electromagnetic wave (EMW) probes 21 and 22 which in this case are coaxial line microwave loop terminations. Open probes may also be used. Either of the probes (and in some cases, as where exceptionally high degrees of accuracy of measurement is desired, there may be a plurality) is connected to one or more variable-frequency oscillators 30, such as voltage controlled oscillator, which is caused to sweep over its frequency range by the sawtooth voltage wave of a sawtooth wave generator. If more than one oscillator is used, each operates within a selected range and the several oscillators are energized simultaneously or sequentially to sweep simultaneously or in succession the requisite frequency spectrum. As there indicated, the output wave of oscillator unit 30 is conveyed to the input probe 21 by a coaxial or two wire line. Energy radiated into the cavity or chamber formed by the tank is picked up by receiving probe 22, and conveyed as by means of a coaxial or two wire line to a detector unit 40. As is evident, the intensity or magnitude of the signal picked up by receiving probe 22 is much greater when the cavity or tank chamber is resonant in one or another of the possible modes of oscillation. Thus, when the tank chamber is resonant, the EMW signal on the receiving probe or antenna provides a manifestation of the resonance condition by the steep-sided peak of signal intensity. At each instance of resonance there is provided such a manifestation in the form of a high-intensity signal.

The signal conveyed to detector unit 40 is therein subjected to analysis or measurement in respect of both amplitude (intensity) and wave frequency. Detector output signals representative of both these characteristics are formed at each resonance frequency swept through by the wave generator or oscillator unit. The detector output signals, which may be analog in character, are conveyed to a computer unit 50 for registration and for processing.

If computer 50 comprises a general purpose digital computer, the unit will include conventional buffer and analog-to-digital converter means whereby the detector output signals are converted to binary representations or signals suitable for processing in the digital computer. In the digital computer memory there will be stored sets of groups of binary signals, each group of which uniquely represents a particular group of empirically obtained signals or manifestations representing a particular respective set of resonance frequencies which in turn represent a unique combination of the tank variables: $p$ (pitch), $r$ (roll), and $q$ (volume of contained liquid) or the equivalent in instructions or algorithm for performing the computation of these quantities. Thus, the computer is programmed to either compute from or compare the incoming group of detector signals, as converted to digital form, with the matrix of the stored signals and to produce an output signal which is converted into analog form by a digital-to-analog converter in the unit and which output signal is conveyed to an indicator unit 60 where it is effective to operate an indicator device, such as a meter, to produce a visible or sense-perceptible indication of the quantity of liquid in the tank.

As is evident, in the instance wherein the computer is of the analog type or of the digital type, the computer is devised to solve three simultaneous equations, each comprising the current or contemporaneous indications of the pitch, $p$, of the tank, the roll, $r$, of the tank, and quantity, $q$, of liquid in the tank all in terms of the resonant frequencies at three modes of vibration. Each resonant frequency swept through during a saw tooth wave cycle of frequency variation of the wave generator is a function of the noted variables. Thus, for the three resonant frequencies $f_1$, $f_2$ and $f_3$, the three Equations I, II and III hold true:

$$f_1 = f_1(q, r, p) \quad \text{(I)}$$
$$f_2 = f_2(q, r, p) \quad \text{(II)}$$
$$f_3 = f_3(q, r, p) \quad \text{(III)}$$

The lowest three independent resonant mode frequencies determined during a frequency sweep of the generator may be used, it being noted that, as indicated in FIGURE 3, more than three modes of resonance of the tank cavity are usual, and that the frequency sweep range is such that at least three such resonances are always swept through by the wave generator. In the case of the analog computer, the computer is devised to solve the three simultaneous Equations I, II and III, to give:

$$q = q(f_1, f_2, f_3) \quad \text{(IV)}$$
$$r = r(f_1, f_2, f_3) \quad \text{(V)}$$
$$p = p(f_1, f_2, f_3) \quad \text{(VI)}$$

In the case of either an analog or a digital computer, the computer is programmed to solve the equations. However, only the solution given by Equation IV, for the quantity of liquid in the tank, is of interest and is the only one of the solutions whose representation by output signal is conveyed to the indicator unit, unless some requirement is set to do otherwise.

The indicator, in the case of a special purpose analog computer, as the computer unit 50, may be simply a voltmeter or milliammeter, with a scale calibrated in terms of liters, gallons, or other volumetric units of measure. Similarly the indicator in the case of the digital computer, may be a voltmeter or milliammeter, but the input signal thereto is formed in the digital-to-analog converter part of the computer unit 50. In this latter case, the signal to the indicator may be a current, or a potential. In both types of computer-indicator combinations the signal is made to be steady, rather than pulsating, whereby the indicator operation is steady.

In a second embodiment of the invention illustrated in FIGURE 4, a plurality of oscillator units, such as 70, 73, and 76 are employed. Each utilizes the space within the tank as the essential part of its oscillatory "tank circuit" or cavity of the oscillator proper, and each has a mid-frequency of oscillation differing relatively widely from the others. Each oscillator is so designed as to be excited only in the frequency range over which a single resonance mode varies in response to variations of quantity of liquid, of tank pitch and of tank roll and it will be understood that each oscillates in its own distinctive mode different from the oscillation mode of the other oscillators. Each oscillator may be provided with a pair of probes (or a single probe which acts as both an input probe and a pick-up probe) suitably arranged within the tank, oscillator 70 having an output probe 71 and a pick-up probe 72 connected to its oscillatory circuit; oscillators 73 and 76 having similar respective pairs of probes 74, 75 and 77, 78. However, it is possible for the oscillators to share the same probe or probes. The several oscillators may be energized concurrently or sequentially as preferred and found to provide the best result.

Since the space within the tank is part of the oscillatory structure in each instance, and since the electromagnetic wave impedance of the tank enclosed space varies in accordance with the space occupied by the tank contents, a particular oscillator will become resonant in its own particular characteristic resonance mode at a family of resonance frequencies dependent upon the pitch angle, roll angle and extent of fill of the tank. Thus, for any combination of pitch attitude and roll attitude of the tank, there results a resonant condition, at a particular unique frequency, for each of the three oscillators, for each possible proportion of unoccupied to occupied tank space. Thus, by providing a computer with either stored data or with appropriate mathematical algorithm defining or representative of the instantaneous pitch attitude, the instantaneous roll attitude, and the contemporaneous resonant frequency at which an oscillator is oscillating, the computer has the information necessary for determining the volume of the liquid then in the tank. Each of the oscillators may be arranged to accommodate the entire volume range of liquid in the tank.

The computer unit 50' may be of either the aforedescribed types and provides, either directly or through an internal digital-to-analog converter, the output signal for operating indicator unit 60'. The latter may be substantially identical to previously explained indicator unit 60.

While the particular method and means for determining volume of liquid in a tank herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown.

We claim:
1. The method of determining the volume of liquid in a tank of known volumetric capacity, said method comprising the steps of:
experimentally determining electromagnetic wave resonance frequency functional relationships for a tank of a particular configuration at each of a series of different pitch attitudes dispersed over the range from maximum negative to maximum positive pitch attitude and at each of a series of different roll attitudes dispersed over the range from maximum negative to maximum positive roll attitude and at each of a series of percentages of liquid occupancy between empty and full, so as to provide for computer determination of the liquid content of the tank at a future time under any of the pitch, roll and liquid volume conditions of the tank, by radiating into the interior of the tank electromagnetic wave energy and detecting at least a portion of the radiated electromagnetic wave energy while sweeping the frequency of the injected electromagnetic wave energy over a band of frequencies during each of the experimental determinations, such band being of sufficient breadth that at least three significant mode resonance frequencies are swept through for each of said experimental determinations;

providing in an electronic computer unit an accessible mathematical manifestation of each of the experimentally derived manifestations of the resonant frequencies swept through for each of said experimental determinations;

subsequently, with liquid in a tank of the same configuration and capacity, similarly radiating into the interior of said tank electromagnetic wave energy while varying the frequency of the radiated wave energy over said band of frequencies, similarly detecting at least a portion of the radiated energy in said tank to provide a specific series of manifestations of at least three significant mode resonance frequencies, and processing by computer correlation said series of specific manifestations with the accessible mathematical manifestations in the computer unit, to determine which of the series of accessible manifestations is most nearly matched with said series of specific manifestations in order to thereby provide an indication of the volume of liquid in the tank.

2. The method defined in claim 1 wherein the manifestations of tank pitch and roll attitudes and quantity of liquid, supplied to the computer unit, are in the form of digital data and wherein there are stored in the computer unit information for providing a solution corresponding to particular input data to the computer unit representing particular values of pitch and roll attitudes of the tank for a set of more resonant frequencies to provide an output signal representing the volume of liquid in the tank.

3. The method defined in claim 1 wherein the accessible mathematical manifestation of the empirical manifestations of the combinations of resonant frequencies swept through and representing for each of the values of tank pitch, tank roll, liquid content and families of three resonant frequencies are in the form of electrical values of electronic components of analog computer means.

4. A system for determining and producing a sense-perceptible indication of the volume of liquid in a closed tank, said system comprising, in combination with said tank:

first means, including sweep-frequency EMW generating means and injecting means in said tank connected to radiate therein electromagnetic wave energy generated by the generating means over a band of EMW frequencies;

second means, connected to said tank, including means for detecting EMW energy radiated in the interior of said tank by said first means and for providing an output signal representative of the frequencies at which the interior of the tank is resonant in at least three modes;

third means, connected to said second means for reception of output signals therefrom and including computer means effective in response to such signals to provide an indicator-actuating signal representative of the volume of liquid in the tank; and fourth means, including indicator means connected to said third means to receive therefrom said indicator-actuating signals and in response thereto to furnish a sense-perceptible indication of the volume of fluid contained in the tank.

5. A volumetric measuring system adapted to provide indications of the volume of liquid contained in a closed tank irrespective of the pitch and roll attitudes of the tank, said system comprising, in combination with the tank:

first means, including electromagnetic wave generating means adapted to generate and establish electromagnetic waves in the interior of said tank whereby at each combination of pitch and roll attitudes of the tank the generating means oscillates at resonant frequencies each unique to a respective proportion of liquid-filled space to empty space in said tank;

second means, including electromagnetic-wave responsive means exposed to the interior of said tank and means connected thereto to derive an output signal representative of any particular one of said resonant frequencies when the electromagnetic wave energy in the interior of said tank is resonant at that particular frequency;

third means, including computer means, connected to said second means for receiving said output signals, said third means being effective in response to reception of any such output signal to provide a respective electric indication representing the volume of liquid then contained in the said tank; and fourth means, including indicating means, connected to said third means and effective to translate an electric indication received therefrom into a sense-perceptible indication of the corresponding volume of liquid then in the tank.

6. A volumetric measuring system as defined in claim 5 characterized in that said first means includes three electromagnetic wave generating means each including said tank chamber as a part of the impedance of their respective oscillating circuits and each operating at different significant mode resonant frequencies.

7. The method of determining the volume of liquid in a tank of known volumetric capacity, said method comprising the steps of:

empirically determining electromagnetic wave resonance frequency functional relationships for a tank of a particular configuration between each of a series of different pitch attitudes dispersed over the range from maximum negative to maximum positive pitch attitude and for each of a series of different roll attitudes dispersed over the range from maximum negative to maximum positive roll attitude and for each of a series of percentages of liquid occupancy between empty and full, so as to provide for computer determination of the liquid content of the tank at a future time under any of the pitch, roll and liquid volume conditions of the tank, by injecting into the interior of the tank electromagnetic energy and receiving therefrom electromagnetic energy while sweeping the frequency of the injected electromagnetic energy over a band of frequencies during each of the empirical determinations, such band being of sufficient breadth that at least three significant mode resonance frequencies are swept through for each of said empirical determinations;

providing in an electronic computer unit an accessible mathematical manifestation of each of the empirical manifestations of the resonant frequencies swept through for each of said empirical determinations;

subsequently, with liquid in a tank of the same configuration and capacity, subjecting the interior of said tank to electromagnetic wave radiation from three fixed frequency oscillators each including said tank as an operative part of its oscillating circuit and oscillating in its own characteristic mode, detecting the propagation and absorption of the radiated energy in said tank to provide a specific series of manifestations of at least three significant mode resonance frequencies, and processing said series of specific manifestations to determine which of the series of accessible manifestations is most nearly matched with said series of specific manifestations in order to thereby determine the volume of liquid in the tank.

References Cited

UNITED STATES PATENTS 3,312,107    4/1967    Burns et al. _____ 73—290

LOUIS R. PRINCE, *Primary Examiner.*

D. O. WOODIEL, *Assistant Examiner.*

UNITED STATES PATENT OFFICE
CERTIFICATE OF CORRECTION

Patent No. 3,447,374　　　　　　　　　　　　　　June 3, 1969

George I. Cohn et al.

It is certified that error appears in the above identified patent and that said Letters Patent are hereby corrected as shown below:

Column 7, line 30, "more" should read -- mode --; same column 7, line 64 and column 8, line 19, "measuring", each occurrence, should read -- measuration --.

Signed and sealed this 21st day of April 1970.

(SEAL)
Attest:

Edward M. Fletcher, Jr.　　　　　　　　　WILLIAM E. SCHUYLER, JR.
Attesting Officer　　　　　　　　　　　　　Commissioner of Patents